(12) United States Patent
Tan

(10) Patent No.: US 6,470,034 B1
(45) Date of Patent: Oct. 22, 2002

(54) METHOD AND APPARATUS FOR REDUCED COMPLEXITY START CODE DETECTION IN COMPRESSED BITSTREAM

(75) Inventor: Thiow Keng Tan, Singapore (SG)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/178,761

(22) Filed: Oct. 26, 1998

(30) Foreign Application Priority Data

Oct. 30, 1997 (JP) .............................................. 9-298627

(51) Int. Cl.[7] .................................................. H04J 3/06
(52) U.S. Cl. ....................................... 370/514; 375/365
(58) Field of Search ............................... 370/503, 509, 370/512, 514; 375/365, 366

(56) References Cited

U.S. PATENT DOCUMENTS 5,872,780 A * 2/1999 Demiray et al. ............ 370/359
5,903,619 A * 5/1999 Chaisemartin ............... 370/510
6,081,570 A * 6/2000 Ghuman et al. ............. 370/514

* cited by examiner

Primary Examiner—Melvin Marcelo
Assistant Examiner—Inder Pal Mehra
(74) Attorney, Agent, or Firm—Greenblum & Bernstein, P.L.C.

(57) ABSTRACT

In coded representation of audio, video and system bitstreams, it is common to insert start codes to facilitate synchronization points. The start codes are usually unique patterns that cannot be duplicated within the bitstream. In the decoding process it is necessary to detect these start codes in order to begin the decoding of the bitstream in a synchronized way. In typical cases, it is normal for the start code to be byte aligned and have the first few bytes comprising of the same pattern. The present invention is a method and apparatus that exploit this feature to reduce the number of comparisons required. A specific order is used in comparing the input bitstream to the start code pattern. Using this order the decoder only need to compare a subset of the bytes during the start code detection process.

4 Claims, 5 Drawing Sheets

METHOD AND APPARATUS FOR REDUCED COMPLEXITY START CODE DETECTION IN COMPRESSED BITSTREAM

BACKGROUND OF THE INVENTION

1. Field of the Invention

This invention is applicable to the field of digital video compression. It can be used to reduce the execution time, computational requirements as well as memory accesses required to search for the start code present in compressed bitstream. Start code search is common in the multiplexing and demultiplexing of multiple elementary video and audio stream. It is also used in the video and audio decoders to identify the start of various synchronization points in the elementary stream. In general this invention is useful when a search for a unique pattern within a bitstream is required. This invention is applicable when the start code exhibits the following characteristics of being byte aligned and begins with repeated bytes.

2. Description of the Related Art

In compressed digital audio and video data it is usually coded in segments representing a fixed frame of audio samples or parts of a picture. In each segment, the context of the current bit being decoded depends on the bits already decoded. Therefore the segment bitstream must be decoded sequentially from beginning to end. It is common to insert a unique sequence of bits or bytes to separate the data or indicate the start of a new segment of the data. This unique sequence of bits or bytes are commonly referred to as start codes. Start codes are useful for random access into the bitstream so that the decoder can start at the next possible entry point. It is also useful when the decoder looses the context of the bitstream due to data error and needs to resynchronize to the next segment of error free bitstream. In the case of the multiplexer that combines the audio and video elementary streams together, time stamps are tagged to start codes to identify the time to present the decoded data in order to achieve audio and video synchronization. Therefore it is desirable to be able to identify these start codes quickly.

An example of start codes used can be found in compression standards such as MPEG-1 and MPEG-2. In the rest of this document the start codes of the MPEG-2 video is used as an example. It contains 23 zeros followed by a 1. The byte following this will then indicate the type of start code. All the start codes are byte aligned. This means that they will always start at the beginning of the byte boundary. This simplifies the search as the comparison can be done at the byte level and not at the bit level.

For the rest of the document the sequence_header_code will be used as an example the bit pattern is "00000000000000000000000110110011" in binary or "$00_h$ $00_h$ $01_h$ $B3_h$" in hexadecimal.

An example of the prior art is shown in FIGS. 1 and 2. It is common to scan through the bitstream comparing each bit or byte against the unique start code. FIG. 1 shows a state diagram of a serial start code decoding process according to the prior art. In the serial start code decoding process, the bytes are sequentially compared to the start code pattern. The state machine changes state from state 1 to 4 depending on how many of the bytes have matched with the pattern. More specifically, FIG. 1 shows the state diagram for the search of a start code representing the sequence_header_ code. The state machine begins in state 0 where everything is reset. It stays in this state until the next byte is $00_h$ when it goes into state 1. If the next byte is also $00_h$ then it goes to state 2. Otherwise it reverts to state 0. From state 2 the state machine goes into state 3 if the next byte is $01_h$. If however the next byte is again $00_h$ the machines remains in state 2. Otherwise it again reverts to state 0. Finally from state 3 if the next byte is $B3_h$, then the state machine arrives at state 4 which is the final state where the start code has been found.

FIG. 2 shows the logical flow chart equivalent of the state machine. The logic begins in module 1 where the next byte is shifted for comparison in module 2. If the byte is not equal to $00_h$ the flow returns to module 1 where the subsequent byte is checked. If the byte is $00_h$ then the logic flows to module 3 where the next byte is shifted In and compared in module 4. If the byte is not equal to $00_h$, then the flow returns to module 1 where the subsequent byte is checked. If the byte is $00_h$ the logic flows to module 5 where the next byte is shifted in and compared in module 6. If the byte is again $00_h$ the logic returns to module 5. If the byte is $01_h$ then the logic flows to module 7. Otherwise the logic flows back to module 1. In module 7 the next byte is shifted in and compared in module 8. If the byte is $B3_h$ then the start code has been found. Otherwise the logic flows back to module 1.

FIG. 1 and 2 illustrates the prior art where each byte in the bitstream is scanned sequentially against the pattern of the start code. The start code is found when 4 consecutive bytes in the bitstream matches the four consecutive bytes in the start code pattern.

The problem to be solve is to reduce the number of comparison required thus reducing the number of memory accesses as well as the computational requirements. As demonstrated in the example of the prior art in FIGS. 1 and 2, each byte of the bitstream has to be compared to a particular pattern.

SUMMARY OF THE INVENTION

In order to decrease the number of bytes compare during the start code search, this invention exploits the redundancy in the start code pattern. The following conditions are necessary for this invention to be useful. Firstly, the start code must be byte aligned thus implying that the start code can be aligned to any byte boundary. Therefore the search and comparison must be done byte by byte. Secondly, the start code pattern must contain two or more consecutive bytes that are the same.

The example start code from MPEG-2 satisfies the conditions above. The start code is byte aligned and the first two bytes in the start code pattern are both $00_h$. Therefore by comparing the second byte instead of the first byte we can make more than one conclusions when the byte is not $00_h$. The first conclusion is that the start code cannot begin at the first byte since the second byte of the bitstream and the second byte of the start code pattern do not match. The second conclusion is that the start code cannot begin at the second byte since the second byte of the bitstream and the first byte of the start code also do not match. Therefore by making one comparison we can make two conclusions if the comparison fails. This implies that only every second byte need to be checked. Thus halving the number of comparison and memory access.

According to a first aspect of the invention, a method of partitioning the coded representation of audio visual material into a plurality of access units whereby the beginning of each access unit is marked by a unique start code and that this start code is aligned to the byte boundaries, said method comprises:

making a first part by a series of two or more identical byte patterns; and making a second part by one or more bytes that together with the first part forms a unique bit pattern that cannot be duplicated by the rest of the valid bitstream.

According to a second aspect of the invention, a method of start code detection in a bitstream comprising coded representation of audio visual material having the properties as in the first aspect, the method comprises the steps of:

aligning the bitstream to its byte boundary;

examining the bitstream for the start code pattern by comparing the byte at the location corresponding to the last byte of the series of identical byte patterns of the start code;

skipping all the bytes up to and including the said byte if the comparison shows that the byte is different from the byte pattern of the start code at that location; otherwise proceeding with byte by byte comparison of the remaining bytes of the start code pattern to determine if there is a match.

According to a third aspect of the invention, an apparatus for start code detection in a bitstream comprising coded representation of audio visual material having the properties as in the first aspect, comprises:

means for aligning the bitstream to its byte boundary;

means for examining the bitstream for the start code pattern by comparing the byte at the location corresponding to the last byte of the series of identical byte patterns of the start code;

means for skipping all the bytes up to and including the said byte if the comparison shows that the byte is different from the byte pattern of the start code at that location; otherwise means for proceeding with byte by byte comparison of the remaining bytes of the start code pattern to determine if there is a match.

According to a fourth aspect of the invention, in the method of the first aspect, the first part of the unique start code is made up of two consecutive bytes of zero bit.

DESCRIPTION OF THE PREFERRED EMBODIMENTS

Figure 1:
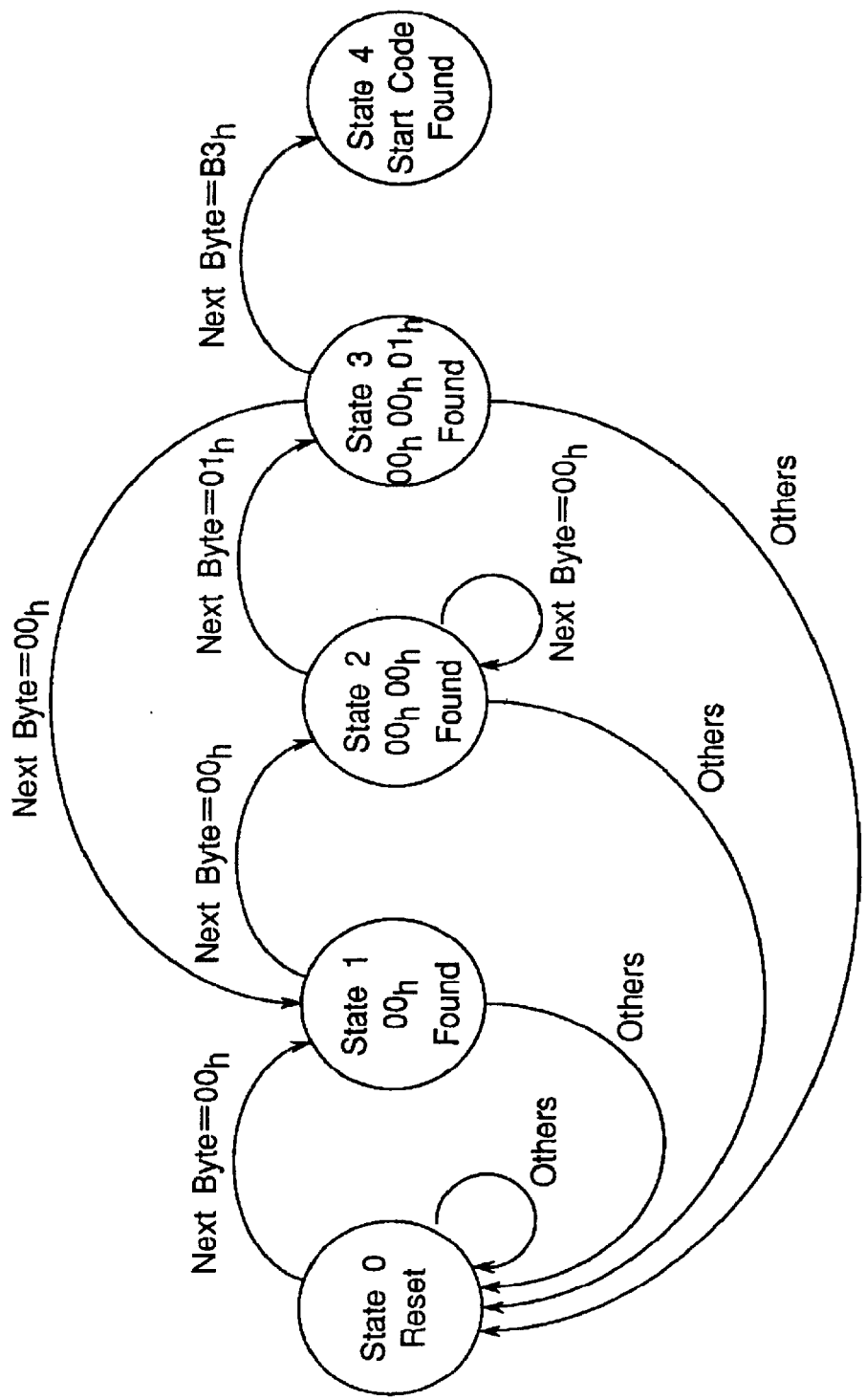
FIG. 1 illustrates a state diagram of a serial start code decoding process according to the prior art.
Figure 2:
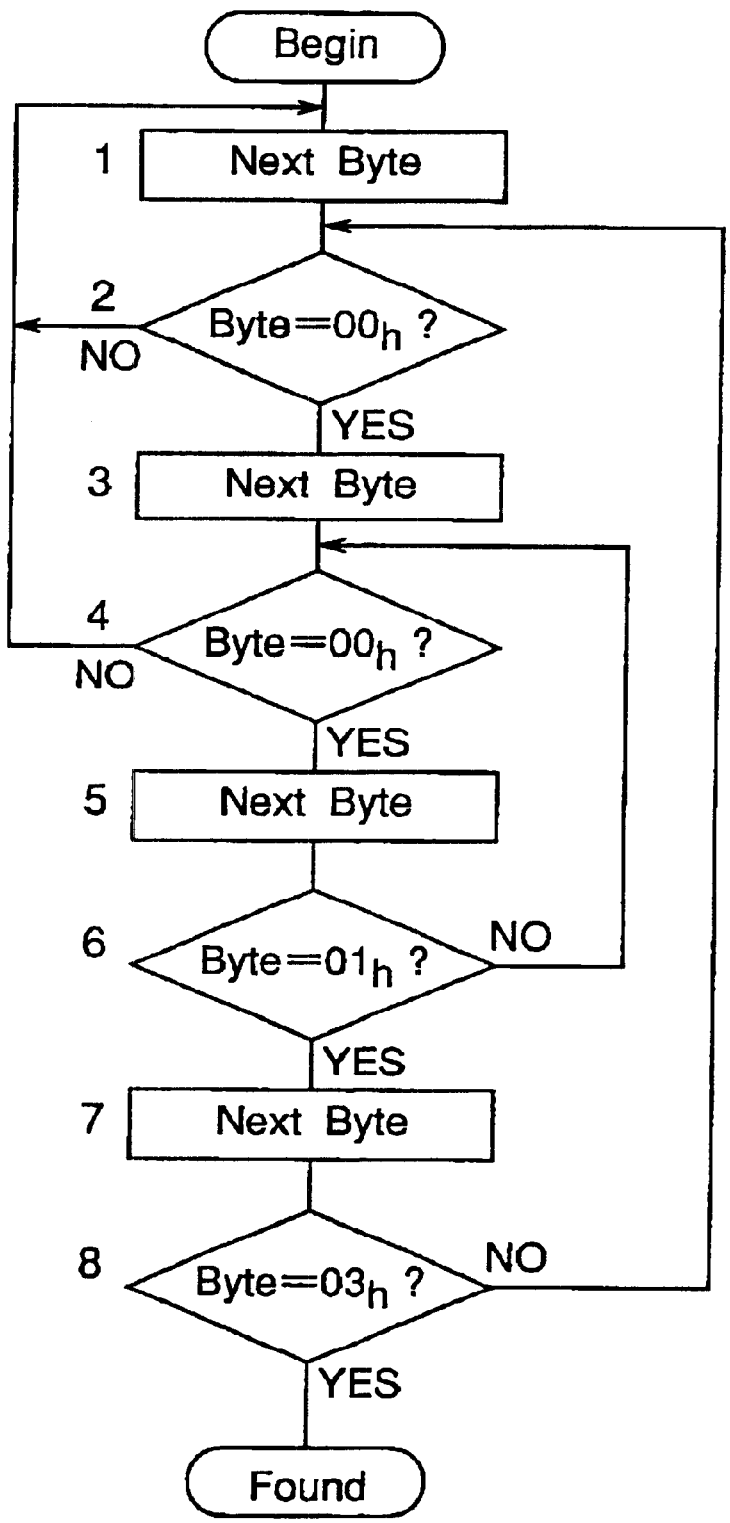
FIG. 2 illustrates a flow chart of the comparisons made with respect to the diagram of FIG. 1, according to the prior art.
Figure 3:
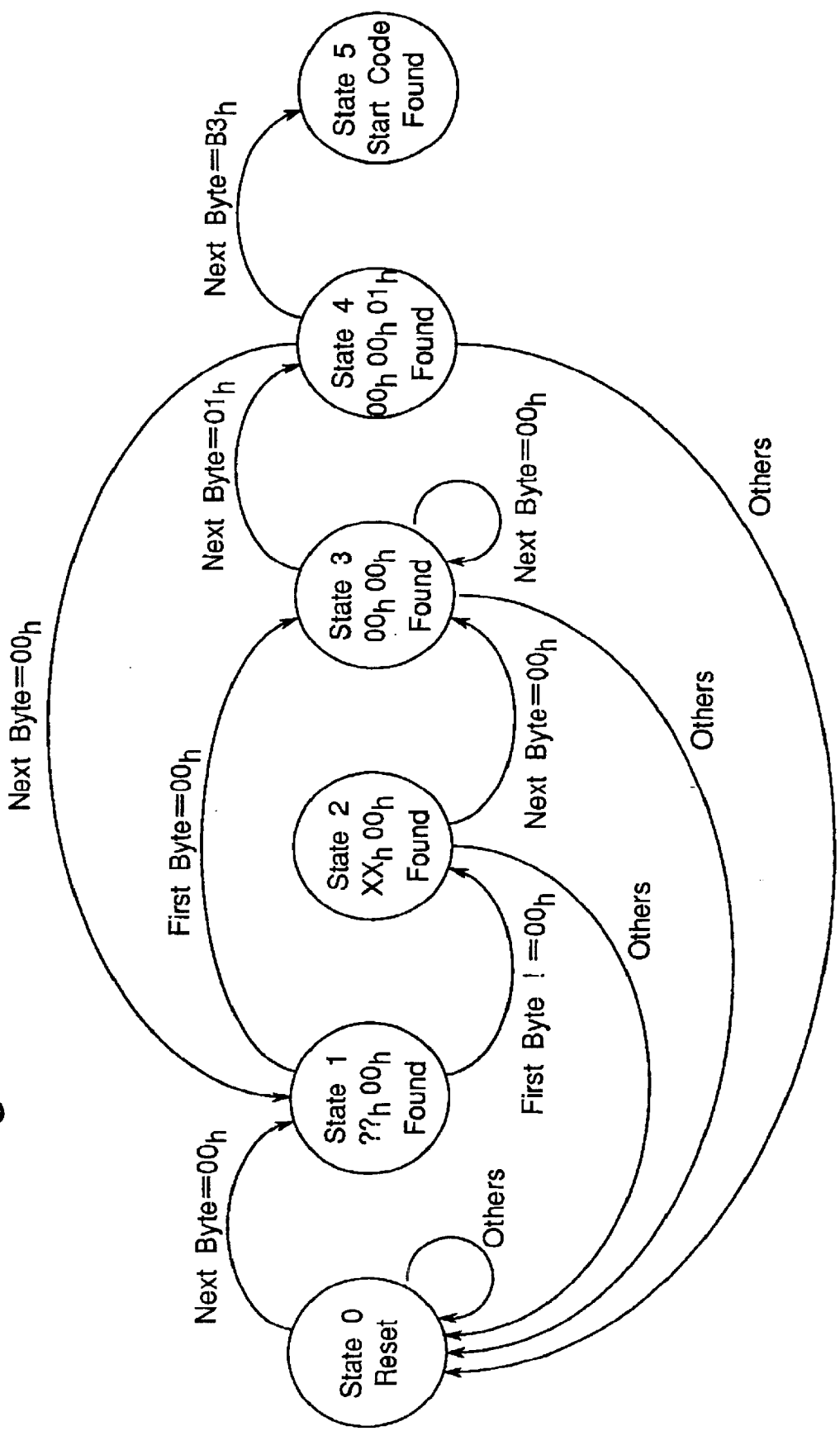
FIG. 3 illustrates a state diagram of the according to the present invention.

Referring to FIG. 3, a state diagram of the present invention is shown where the second byte is first compared to the pattern. This allows the comparison to skip over the first byte without comparing it if the second byte do not match the pattern. More specifically, FIG. 3 shows the conclusion that can be drawn when the second byte in the bitstream is and is not $00_h$. The state machine begins in state 0 where everything is reset. It stays in this state until the second byte is $00_h$ when it goes into state 1. If the first byte is also $00_h$ then it goes to state 3: Otherwise it goes to state 2. In state 2 if the next byte is $00_h$ the state machine goes to state 3. Otherwise it reverts to state 0 and everything is reset. From state 3 the state machine goes into state 4 if the next byte is $01_h$. If however the next byte is again $00_h$ the machines remains in state 3. Otherwise it again reverts to state 0. Finally from state 4, if the next byte is $B3_h$, then the state machine arrives at state 5 which is the final state where the start code has been found. The main difference when compared to the state machine of the prior art is that the comparison starts in the second byte. This implies that when a comparison fails and goes back to state 0, two bytes are skipped instead of one. This is more clearly illustrated in the flow chart in FIG. 4.

Figure 4:
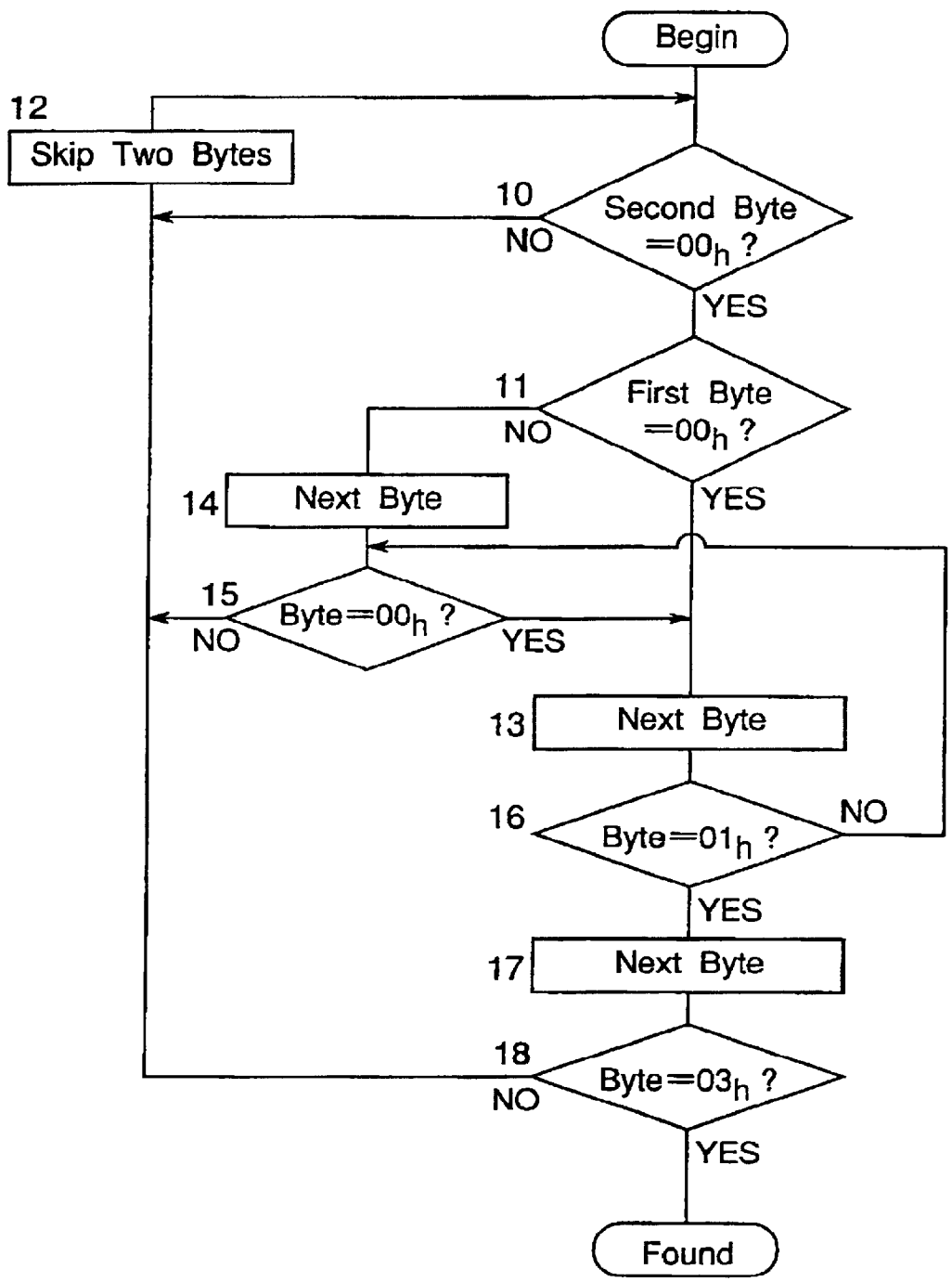
FIG. 4 illustrates a flow chart of the comparisons made with respect to the diagram of FIG. 3, according to the present invention.

In FIG. 4, the operations begin by comparing the second byte of the bitstream in module 10. If the byte is equal to $00_h$, the comparison proceeds to module 11 where the first byte is compared. Otherwise the operation is passed to module 12 where two bytes are skipped before the operation continues in module 10 again. In module 11, if the first byte is equal to $00_h$ then the processing is passed to module 13. Otherwise the processing is passed to module 14 where the next byte is shifted in for comparison in module 15. In module 15, if the byte is $00_h$ the processing is again passed to module 13. Otherwise the comparison thus far has failed and two bytes are skipped in module 12 before the process begins again in module 10. In module 13, the next byte is shifted in for comparison in module 16. If the byte is equal to $01_h$, then three of the four bytes have matched and the processing is passed to module 17. If however, the byte is not $01_h$, there is a possibility that it may be $00_h$. The processing in this case is passed to module 15 for comparison (without any bytes being shifted). In module 17, the next byte is shifted in for comparison in module 18. If the byte is $B3_h$, then the start code have been found. Otherwise, the comparison have again failed and two bytes are skipped in module 12 before the process begins again in module 10.

Figure 5:
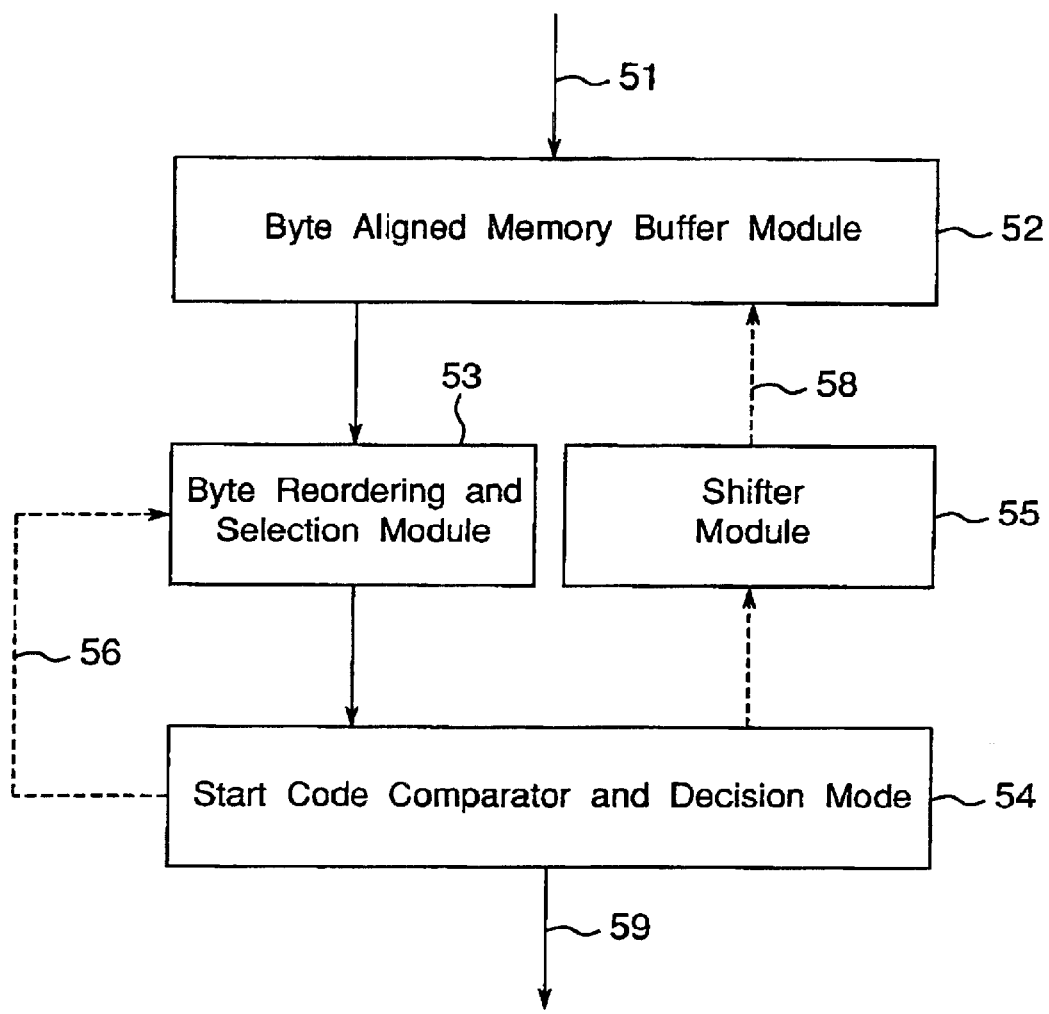
FIG. 5 illustrates an apparatus for the start code detection process according to the present invention.

FIG. 5 shows an apparatus for performing the start code detection of the current invention. The bitstream, 51, is passed into the byte aligned memory buffer module, 52, where it is byte aligned and buffered. The Byte Reordering and Selection Module, 53, then extracts the correct number of bytes from the buffer and rearrange the order of the bytes into the order of comparison of the current invention. The Start Code Comparator and Decision Module, 54, request for the desired byte through control line. 56, from the Byte Reordering and Selection Module. The comparison is made in the comparator module and the result is passed through line 59. Depending on the outcome of the comparison, the Shifter Module, 55, is controlled via line 57. The Shifter Module in turn controls the Byte Aligned Memory Buffer Module via; line 58, to shift the correct number of bytes in to and out of the buffer.

The effect of the invention is that there is high likelihood that more than one byte is skipped when the comparison fails. A simple estimation of the savings can be made by assuming that all 8 bit symbols are equally likely to occur. This gives the probability of the symbol $XX_h$, $p(XX_h)$, as 1 in 256. It can then be shown that the probability of being in state 0 in both the prior art and in the current invention is very close to 1. This means that in the prior art we are always shifting one byte and making one comparison. However, in the current invention, we are most of the time shifting two bytes and only comparing the second byte. Therefore the number of operations required is also halved.

This invention therefore effectively half the number of comparisons and memory accesses needed. This is particularly useful in a software environment where the processing resources saved can be utilized for other operations.

What is claimed Is:

1. A method of partitioning a coded representation of audio visual material into a plurality of access units whereby the beginning of each access unit is marked by a unique start code, the start code being aligned with a plurality of byte boundaries, the method comprising:

making a first part by a series of at least two identical byte patterns;

making a second part by at least one byte, the second part together with the first part forming a unique bit pattern that cannot be duplicated by the rest of a valid bitstream;

starting a comparison in a second byte; and skipping two bytes when the comparison fails and returns to zero state.

2. A method of start code detection in a bitstream comprising a coded representation of audio visual material by partitioning the coded representation of audio visual material into a plurality of access units whereby the beginning of each access unit is marked by a unique start code, the start code being aligned to a plurality of byte boundaries, the method comprising:

making a first part by a series of at least two identical byte patterns;

making a second part by at least one byte, the second part together with the first part forming a unique bit pattern that cannot be duplicated by the rest of a valid bitstream, aligning the bitstream to its byte boundary;

examining the bitstream for the start code pattern by comparing the byte at the location corresponding to the last byte of the series of identical byte patterns to the start code pattern;

skipping all the bytes up to and including the byte at the corresponding location if the comparison shows that the byte at the corresponding location is different from the byte pattern of the start code pattern at that location and;

otherwise, proceeding with a byte by byte comparison of the remaining bytes to the start code pattern to determine if there is a match.

3. An apparatus for start code detection in a bitstream comprising coded representation of audio visual material by partitioning the coded representation of audio visual material into a plurality of access units whereby the beginning of each access unit is marked by a unique start code, the start code being aligned to a plurality of byte boundaries, by making a first part by a series of at least two identical byte patterns and making a second part by at least one byte, the second part together with the first part forming a unique bit pattern that cannot be duplicated by the rest of a valid bitstream, said apparatus for start code detection comprising:

an aligning device that aligns the bitstream to its byte boundary;

an examining device that examines the bitstream for the start code pattern by comparing the byte at the location corresponding to the last byte of the series of identical byte patterns to the start code pattern;

a processing device that skips all the bytes up to and including the byte at the corresponding location if the comparison shows that the byte at the corresponding location is different from the byte pattern of the start code pattern at the location, otherwise the processing device performs a byte by byte comparison of the remaining bytes to the start code pattern to determine if there is a match.

4. A method according to claim 1, wherein the first part of the unique start code is made up of two consecutive bytes of zero bit.

* * * * *

UNITED STATES PATENT AND TRADEMARK OFFICE
CERTIFICATE OF CORRECTION

PATENT NO. : 6,470,034 B1 Page 1 of 1
DATED : October 22, 2002
INVENTOR(S) : T. K. Tan It is certified that error appears in the above-identified patent and that said Letters Patent is hereby corrected as shown below:

<u>Title page,</u>
Item [56], Refrences Cited, the following U.S. PATENT DOCUMENTS were omitted and should be included:

| -- 5,963,260 | 10/1999 | Bakhmusky | 375 |
| 5,774,206 | 6/1998 | Wasserman et al. | 709 -- |

Signed and Sealed this

Twenty-ninth Day of April, 2003

JAMES E. ROGAN
*Director of the United States Patent and Trademark Office*